(12) United States Patent
Saggi

(10) Patent No.: US 10,290,021 B2
(45) Date of Patent: May 14, 2019

(54) DISSEMINATION OF ADS VIA POINT OF SALE TERMINALS OVER A COMMUNICATIONS NETWORK

(71) Applicant: Rajesh Saggi, Livingston, NJ (US)

(72) Inventor: Rajesh Saggi, Livingston, NJ (US)

(*) Notice: Subject to any disclaimer, the term of this patent is extended or adjusted under 35 U.S.C. 154(b) by 1017 days.

(21) Appl. No.: 14/444,539

(22) Filed: Jul. 28, 2014

(65) Prior Publication Data

US 2016/0027058 A1   Jan. 28, 2016

(51) Int. Cl.
*G06Q 30/02* (2012.01)

(52) U.S. Cl.
CPC ..... *G06Q 30/0267* (2013.01); *G06Q 30/0257* (2013.01); *G06Q 30/0268* (2013.01); *G06Q 30/0271* (2013.01)

(58) Field of Classification Search
None
See application file for complete search history.

(56) References Cited

U.S. PATENT DOCUMENTS

| | | | | |
|---|---|---|---|---|
| 8,548,847 | B2* | 10/2013 | Roberts | G06Q 30/02 705/14.1 |
| 2003/0004808 | A1* | 1/2003 | Elhaoussine | G06Q 20/045 705/14.27 |
| 2004/0167818 | A1* | 8/2004 | Iwahashi | G06Q 20/387 705/14.66 |
| 2005/0004840 | A1* | 1/2005 | Wanninger | G06Q 30/02 705/14.64 |
| 2007/0061193 | A1* | 3/2007 | Libonati | G06Q 30/0267 705/14.64 |
| 2008/0262928 | A1* | 10/2008 | Michaelis | G06Q 30/02 705/14.26 |
| 2011/0015987 | A1* | 1/2011 | Chakraborty | G06Q 30/02 705/14.39 |
| 2013/0024255 | A1* | 1/2013 | Mittereder | G06Q 30/02 705/14.17 |

* cited by examiner

*Primary Examiner* — Sam Refai
*Assistant Examiner* — Rashida R Shorter
(74) *Attorney, Agent, or Firm* — Mark Terry

(57) ABSTRACT

A method for disseminating ads over a communications network is disclosed. The method includes transmitting a plurality of ads to a plurality of terminals, receiving from a terminal a consumer's telephone number/email address/social network handle, a unique ad identifier for a particular ad and a unique terminal identifier, generating and storing a record including the consumer's telephone number/email address/social network handle, the unique ad identifier and the unique terminal identifier, generating a message associated with the particular ad, transmitting to a text message gateway/email server/social network a request to send a message to the consumer's telephone number/email address/social network handle, receiving a request from the consumer's mobile device, accessing the record using the unique record identifier, generating a custom page based on the data from the record, and transmitting the custom page to the consumer's mobile device.

20 Claims, 11 Drawing Sheets

DISSEMINATION OF ADS VIA POINT OF SALE TERMINALS OVER A COMMUNICATIONS NETWORK

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The disclosed embodiments relate to the field of electronic commerce and, more specifically, the disclosed embodiments relate to the field of targeted advertising over communications networks.

BACKGROUND OF THE INVENTION

Online advertising involves the use of the Internet and other communications networks to deliver promotional marketing messages to consumers. Online advertising includes email marketing, search engine marketing, social media marketing, web banner advertising, and mobile advertising. As with most other advertising media, online advertising involves a publisher, who integrates advertisements into the content delivered to the consumer, and an advertiser, who provides the advertisements to be displayed on the publisher's content. In recent years, online advertising has become a large and growing industry, with U.S. Internet advertising revenue hitting a historic high of $20 billion for the first half of 2013 alone.

With the increasing availability of mobile computing devices, including smart phones, tablets, personal information devices and wearable computers, the online advertising industry has moved to mobile computing devices. As consumers surf the Web on their cellular telephones or Internet enabled tablets, they are served ads in the same way they encounter ads on standard desktop computers. Further, consumers are accustomed to receiving text messages on their mobile telephones advertising products and services. One area where online advertising is lacking, however, is targeting of ads.

Targeted advertising is a type of advertising whereby advertisements are placed so as to reach consumers based on various traits such as demographics, psychographics, behavioral variables, product purchase history, etc. Targeted advertising systems serve ads directly based on demographic, psychographic, or behavioral attributes associated with the consumer exposed to the ad. Most recently, the geographic location of consumers has been used to determine which ads should be used to advertise to certain consumers. Often, GPS on a consumer's mobile phone is used to obtain a consumer's location. GPS, however, lacks the type of accuracy to pinpoint the location of consumers in dense areas, such as shopping malls, big cities and other densely packed locales.

Another area where online advertising is lacking is the ability to deliver those ads to consumers in a usable form. Consumers often see ads on their computers and mobile phones and desire to use those ads when purchasing the advertised product or service, especially when the ad advertises a discount or other benefit. But usually, consumers view said ads in a passive form and do not further interact with the ad, other than reading it. This limits the effect of the ad and its usability to consumers when making purchases involving the very products or services promoted in the ad.

Therefore, a need exists to overcome the problems with the prior art, and more specifically, there is a need for a more efficient and time sensitive system and method for targeting and disseminating ads over a communications network.

BRIEF SUMMARY OF THE INVENTION

In one embodiment, the disclosed embodiment depict a method for disseminating ads over a communications network. The method includes: a) transmitting, over the communications network, a plurality of ads to a plurality of terminals, wherein each of the plurality of terminals is associated with a unique terminal identifier, and wherein each of the plurality of ads is associated with a unique ad identifier; b) receiving, over the communications network, a data packet from a particular one of the plurality of terminals at the direction of a consumer, wherein the data packet includes the consumer's telephone number/email/address/social network handle, a unique ad identifier for a particular one of the plurality of ads and a unique terminal identifier for the particular one of the plurality of terminals; c) generating a record including the consumer's telephone number/email/address/social network handle, the unique ad identifier and the unique terminal identifier, and further including a unique record identifier and a timestamp, and storing said record in a connected database; d) generating a message associated with the particular one of the plurality of ads, wherein the message includes alphanumeric data, the unique record identifier and a link configured to transmit a request including the unique record identifier to the server when activated; e) transmitting, over the communications network, to a text message gateway/email server/social network a request to send a message, wherein the request includes the message and the consumer's telephone number/email/address/social network handle; f) receiving, over the communications network, a request including the unique record identifier from the consumer's mobile device identified by the consumer's telephone number/email/address/social network handle; g) accessing, in the connected database, the record using the unique record identifier, and reading data in the record; h) generating a custom page based on the data from the record, wherein content of the custom page corresponds to the particular one of the plurality of ads; and, i) transmitting, over the communications network, the custom page to the consumer's mobile device identified by the consumer's telephone number/email/address/social network handle.

Additional aspects of the disclosed embodiment will be set forth in part in the description which follows, and in part will be obvious from the description, or may be learned by practice of the disclosed embodiments. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

The disclosed embodiments improve upon the problems with the prior art by providing a system that allows for quick and easy dissemination of ads over a communications network. The disclosed embodiments leverage the reduced costs of mobile devices to produce a network of connected terminals distributed in a variety of locations (inside stores, in common areas and other public places) and made available consumers. Said placement of terminals allows for more precise targeting of ads, because the details surrounding the location of each terminal (type of store, amount of foot traffic, type of consumer, etc.) is known to the distributor of the ads. This is advantageous for advertisers and it allows for better and more efficient targeting of ads. An additional benefit of the disclosed embodiments is the usability of the advertisements distributed to the consumers. The disclosed embodiments include an arrangement wherein consumers can request that ads and offers for goods and services are sent directly to consumers' mobile devices. This is beneficial for consumers as it allows them to utilize said ads or offers for goods or services at a later or during purchase of the advertised goods or services if the ad or offer includes a discount or other benefit at the point of purchase. This further increase the effectiveness of the ads.

Figure 1:
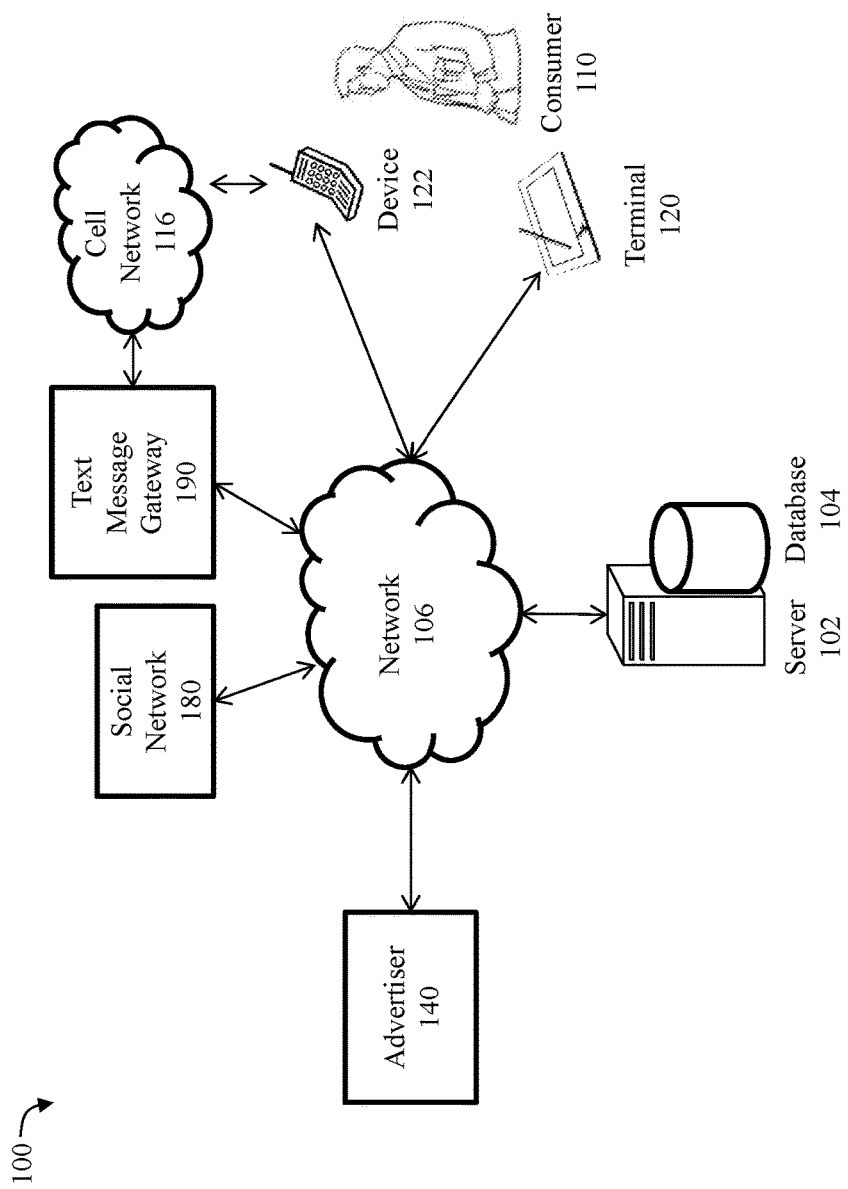
FIG. 1 is a block diagram illustrating the network architecture of a system for disseminating ads over a communications network, in accordance with one embodiment.
Figure 2A:
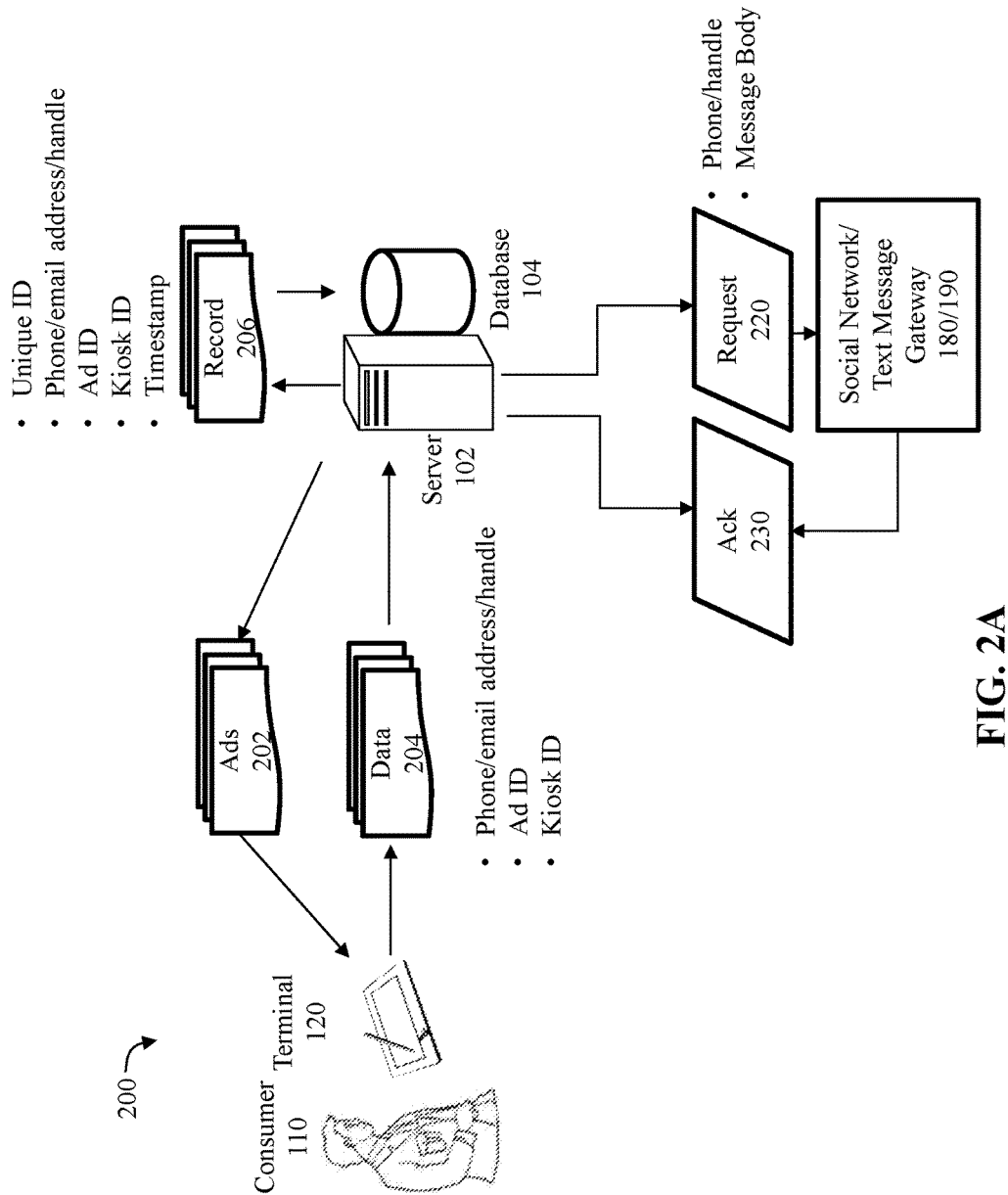
FIG. 2A is a block diagram illustrating a first data flow of the system for disseminating ads over a communications network, in accordance with one embodiment.
Figure 2B:
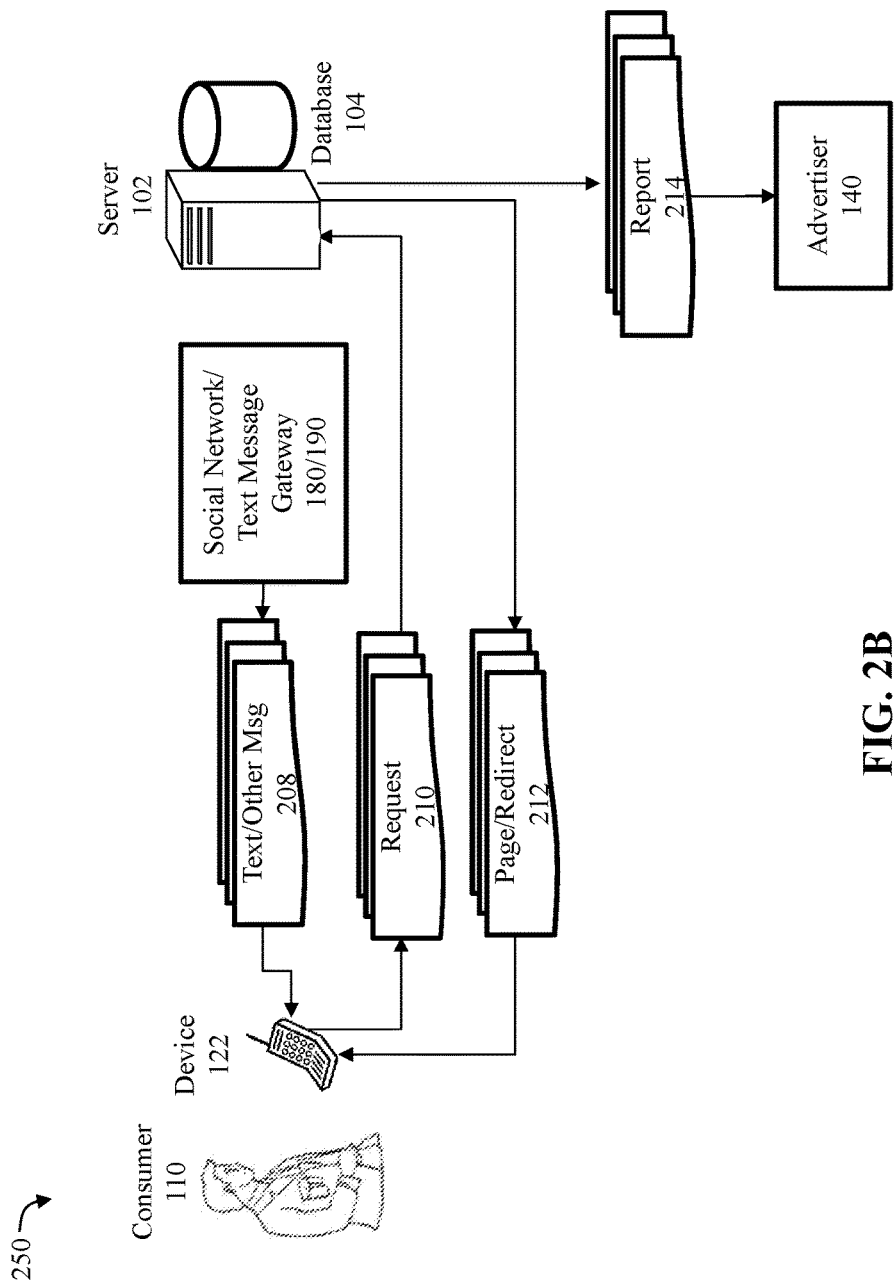
FIG. 2B is a block diagram illustrating a second data flow of the system for disseminating ads over a communications network, in accordance with one embodiment.

Referring now to the drawing figures in which like reference designators refer to like elements, there is shown in FIG. 1 an illustration of a block diagram showing the network architecture of a system and method for disseminating ads over a communications network in accordance with the principles of the present invention. The most prominent element of FIG. 1 is the server 102 associated with repository or database 104 and further coupled with network 106, which can be a circuit switched network, such as the Public Service Telephone Network (PSTN), or a packet switched network, such as the Internet or the World Wide Web, the global telephone network, a cellular network, a mobile communications network, or any combination of the above. In one embodiment, network 106 is a secure network wherein communications between endpoints are encrypted so as to ensure the security of the data being transmitted. Server 102 is a central controller or operator for the functionality that executes on computer 120, namely, the processing of ads provided to the consumers 110 via various methods.

FIG. 1 further includes mobile devices 120 and 122, which may be smart phones, mobile phones, tablet computers, handheld computers, laptops, or the like. Mobile device 122 corresponds to consumer 110. Terminal 120 may be a public or group tablet or terminal located in a public place, such as a grocery store or a liquor store. FIG. 1 also shows advertiser 140, which is third party entity which may provide ads to the server 102 in an electronic format. FIG. 1 also includes social network 180, which may an online social networking service, such as Facebook and Twitter, which provides well known social networking services, such as message delivery, profile creation and browsing, etc. Lastly, FIG. 1 shows text message gateway 190, which may be a third party entity that provides text messaging services (including both SMS and MMS messages) to server 102. The text message gateway 190 and device 122 are coupled with cellular network 116 (in addition to network 106), which is a mobile phone network comprising a wireless communications network of transceivers.

FIG. 1 further shows that server 102 includes a database or repository 104, which may be one or more of a relational database comprising a Structured Query Language (SQL) database stored in a SQL server, a columnar database, a document database and a graph database. Computers 120, 122 may also each include their own database. The repository 104 serves data from a database, which is a repository for data used by server 102 and the mobile devices during the course of operation of the invention.

The database 104 may include a record for each of a plurality of ads or offers. An ad or offer record may comprise a unique record identifier, a unique ad identifier, a product or service description, an image of the product or service, video of the product or service, audio of the product or service, a price of the product or service, a discount price, an offer for a product or service, multimedia commercials for the product or service, references to terminal records, references to consumer records, a web page or other renderable computer code, etc. An ad record may also include a URL for the corresponding advertiser (such as 140), instructions on how to effectuate a redirect to the advertiser's URL, or instructions on how to generate a dynamic web page and serve it to the consumer. The database 104 may also include a record for each of a plurality of terminals 120. A terminal record may include a unique record identifier, a unique terminal identifier, a geographic location identifier (such as latitude and longitude coordinates) for the location of the terminal, a mailing address for the location of the terminal, a description of the location for the location of the terminal, a type of the location for the location of the terminal, a description of the business located at the location of the terminal, references to ad records, references to consumer records, etc.

The database 104 may include a consumer record for each consumer 110 with which server 102 has had previous communications. A consumer record may include: a unique record identifier, contact/identifying information for the consumer, the telephone number/email address/social network handle of the consumer, unique ad identifiers for ads requested by the consumer (as described in FIG. 3 below), dates and times (i.e., timestamps) for instances when the consumer requested said ads, unique terminal identifiers for each instance when the consumer requested said ads, references to terminal records, references to ad records, etc. A consumer record may also include a unique identifier for each consumer, a residential address for each consumer, the current location of each consumer (based on location-based services from the user's mobile computer) and demographic data for each consumer, such as age, sex, income data, race, color, marital status, etc. Lastly, the database 104 may include an activity record for each instance in which a consumer 110 interacts with an ad served by server 102. An activity record may include any of the data found in a consumer record, terminal record or an ad record, and further includes a unique record identifier, a consumer's email address/telephone number/social media handle, a unique ad identifier, a unique terminal identifier, and a timestamp. An activity record may also include references to other activity records, consumer records, terminal records and ad records.

FIG. 1 shows an embodiment wherein networked computing devices 120, 122, 180, 190, 140 may interact with server 102 and repository 104 over the network 106. Server 102 includes a software engine that delivers applications, data, program code and other information to networked computing devices 120, 122, 180, 190, 140. The software engine of server 102 may perform other processes such as audio and/or video streaming or other standards for transferring multimedia data in a stream of packets that are interpreted and rendered by a software application as the packets arrive. It should be noted that although FIG. 1 shows only two networked mobile computing devices 120, 122, the system of the present invention supports any number of networked mobile computing devices connected via network 106.

Server 102 also includes program logic comprising computer source code, scripting language code or interpreted language code that is compiled to produce executable file or computer instructions that perform various functions of the present invention. In another embodiment, the program logic may be distributed among more than one of server 102, computers 120, 122 and 140, or any combination of the above.

Note that although server 102 is shown as a single and independent entity, in one embodiment of the present invention, the functions of server 102 may be integrated with another entity, such as 120, 140, 180, 190. Further, server 102 and its functionality, according to a preferred embodiment of the present invention, can be realized in a centralized fashion in one computer system or in a distributed fashion wherein different elements are spread across several interconnected computer systems.

The network architecture of FIG. 1 in accordance with the principles of the disclosed embodiments may give rise to various revenue-generating arrangements. The advertiser 140 may, for example, pay fees to the operators of server 102 in exchange for the services provided by server 102, i.e., the provision of ads to the terminals 120 and to the mobile devices 122 of consumers 110.

The process of disseminating ads over a communications network will now be described with reference to FIGS. 2A through 4 below. FIGS. 2A through 4 depict, among other things, the data flow and control flow in the process for disseminating ads over a communications network 106, according to one embodiment. The process of the disclosed embodiments begins with step 402 (see flowchart 400), wherein the server 102 provides ads 202 from the database 104 to the terminals 120 via network 106. Said ads 202 may have been provided to server 102 from advertiser 104 to server 102 via network 106 using HTTP. Each ad corresponds to an ad record in database 104. Each of said ads 202 (see screen 300 of FIG. 3A) may comprise one or more pieces of data from a corresponding ad record in database 104. In one embodiment, each ad 202 comprises a web page or other renderable computer code.

In step 404, the consumer 110 interacts with, or provides commands to, terminal 120 and clicks on an ad 202. In doing so, the consumer 110 may enter information, such as a telephone number, email address or social network handle. See screens 310, 320, 330 of FIGS. 3B, 3C, 3D.

In step 406, in response to the consumer's commands, the terminal 120 sends a data packet 204 to server 102 via network 106. The data packet may include one or more of the consumer's telephone number/email address/social network handle, a unique ad identifier for the ad the consumer desires to view, and a unique terminal identifier for the terminal 120. The data packet 204 may be sent via HTTP or HTTPS.

In step 450, the server 102 reads the consumer's telephone number/email address/social network handle and accesses the database 104 to determine whether the database 104 has previously created a record (such as an activity record) that references this particular consumer 110, as identified by his telephone number, email address or social network handle. I.e., the server 102 determines whether that particular consumer 110 has previously interacted with the plurality of ads served by server 102 via one of the terminals 120. Server 102 may accomplish this step simply by looking for the consumer's telephone number, email address or social network handle in the database 104. If found, then the consumer 110 has previously interacted with the plurality of ads served by server 102 via one of the terminals 120 and the control flows to step 452. If not found, then the consumer 110 has not previously interacted with the plurality of ads served by server 102 via one of the terminals 120 and the control flows to step 408.

In step 452, server 102 accesses a previously stored record 206 (such as an activity record) in the database 104, wherein the record includes the consumer's telephone number, email address or social network handle, and the following previously stored data: a unique ad identifier, a unique terminal identifier, a unique record identifier and a timestamp. Subsequently, the server 102 adds additional data to record 206 reflecting the consumer's most recent interactions with an ad served by server 102, including: a unique ad identifier, a unique terminal identifier, and a timestamp. Alternatively, instead of accessing the previously stored record 206 and adding additional data to record 206 reflecting the consumer's most recent interactions, the server 102 creates an entirely new stored record comprising the consumer's telephone number, email address or social network handle, a unique record identifier and the following data reflecting the consumer's most recent interactions: a unique ad identifier, a unique terminal identifier, and a timestamp. Then, control flows to step 410.

In step 408, server 102 creates and stores a record 206 (such as an activity record) in the database 104, wherein the record includes the consumer's telephone number, the unique ad identifier and the unique terminal identifier, and further includes a unique record identifier and a timestamp, which may be the date and time data 204 was received or the date and time the record 206 was generated.

In step 410, server 102 creates a message associated with the ad the consumer desires to view (in this instance), wherein the message includes alphanumeric data, the unique record identifier (of record 206) and a link configured to transmit a request including the unique record identifier to the server 102 when activated. Thus, the message may include alphanumeric text with introductory language, such as "Click here to view the coupon you requested," a unique record identifier, such as "348329324" and a link, which may be a hypertext string that either requests a web page from server 102 or redirects to an advertiser site (such as advertiser 140).

In step 412, server 102 transmits a request 220 to text message gateway 190, wherein the request includes the message generated in step 410 and the consumer's telephone number. Alternatively, in step 412, server 102 transmits a request 220 to social network 180, wherein the request includes the message generated in step 410 and the consumer's social network handle. Alternatively, in step 412, server 102 transmits a request 220 to an email server, wherein the request includes the message generated in step 410 and the consumer's email address. In response, the social network 180 or text message gateway 190 or email server sends an acknowledgement of receipt of the request 220 back to server 102.

In step 414, the text message gateway 190 receives the request 220 and proceeds to send the requested text message 208 to device 122 of user 110. For example, gateway 190 may send a text message 208 to device 122 of use 110 via cellular network 116 or network 106. Alternatively, in step 414, the social network 180 receives the request 220 and proceeds to send the requested message 208 to device 122 of user 110 via network 106. Alternatively, in step 414, the email server receives the request 220 and proceeds to send the requested message 208 (i.e., an email) to device 122 of user 110 via network 106.

In step 416, the consumer 110 interacts with the text message, social network message or email 208, such as by clicking or touching the link in the message 208. Step 416 may be performed similarly to the process described with respect to screens 300, 310, 320, 330 of FIGS. 3A, 3B, 3C, 3D. In response, the device 122 sends, via network 106, a request 210 (such as an HTTP request) to server 102, wherein the request 210 includes the unique record identifier of record 206.

In step 418, the server reads the unique record identifier in request 210 and accesses in database 104 the record 206 (or related records that were created subsequent to record 206; see above with respect to step 452; wherein said record 206 may be an activity record) that corresponds to the unique record identifier in request 210. The accessed record includes a reference to the ad the consumer desires to view in this instance (as previously stored in step 408 or in step 452).

In step 420, the server 102 generates a custom web page based on the data that was read from the record 206. The content of the custom page corresponds to the ad the consumer desires to view in this instance (as previously stored in step 408 or in step 452). In one embodiment, the server 102 reads multimedia content from the record 206 (or from another record referenced by record 206) and uses said multimedia content to generate said custom page. In another embodiment, the server 102 reads instructions (such as computer programming instructions) from the record 206 (or from another record referenced by record 206) and uses said instructions to generate said custom page.

Figure 3A:
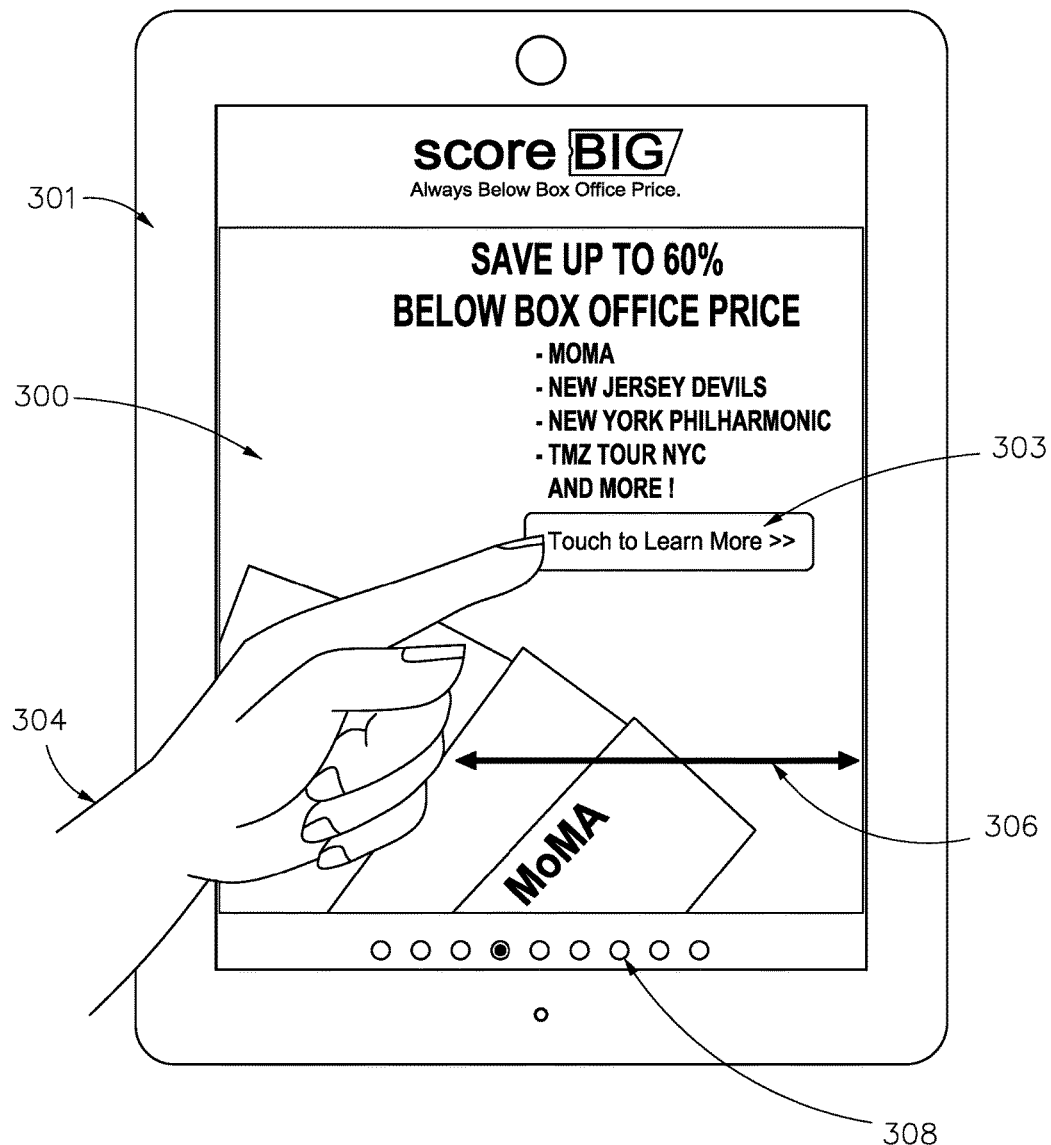
FIGS. 3A-3F are illustrations depicting various screens presented to consumers during the process for disseminating ads over a communications network, in accordance with one embodiment.
Figure 3B:
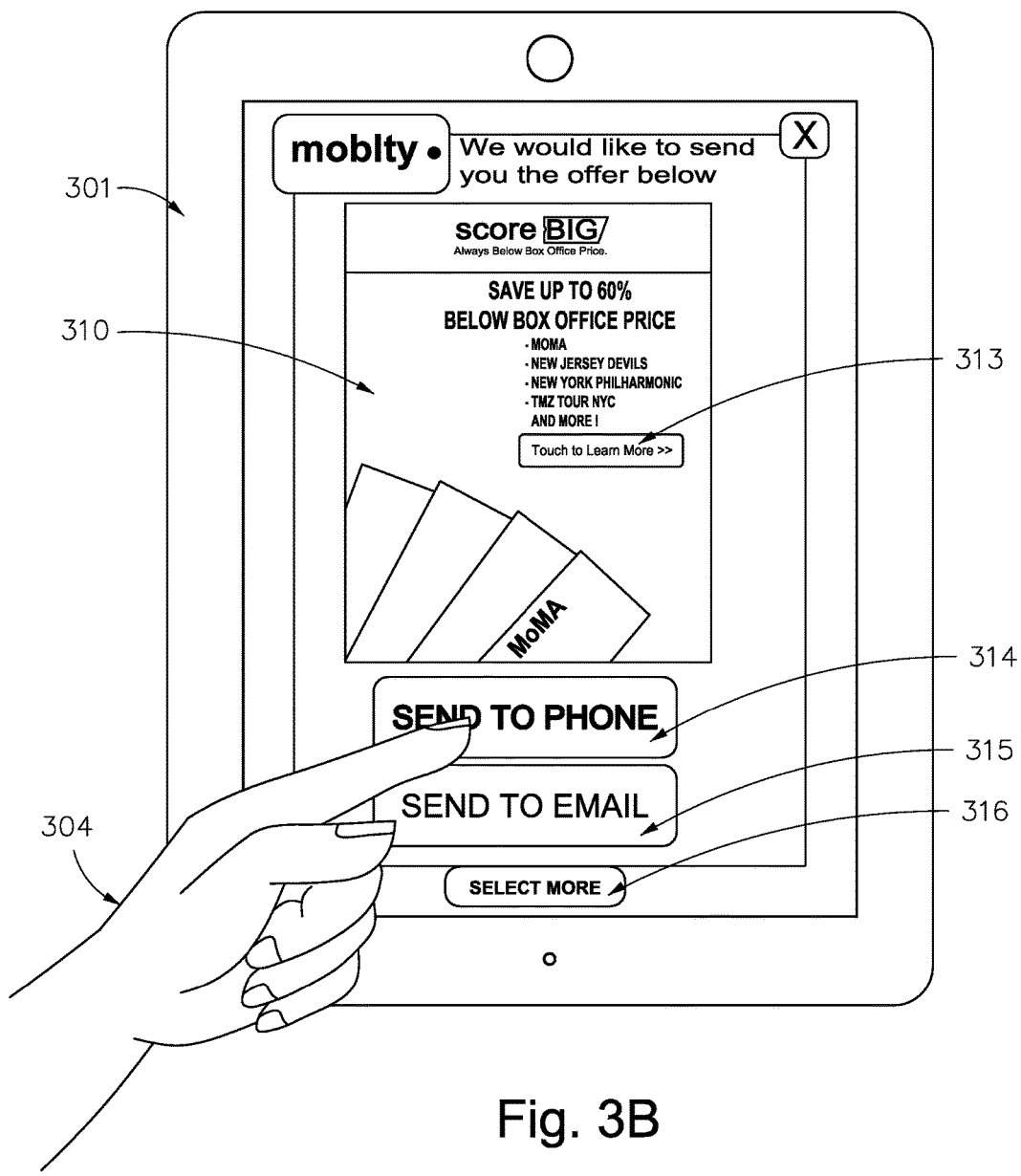
Figure 3C:
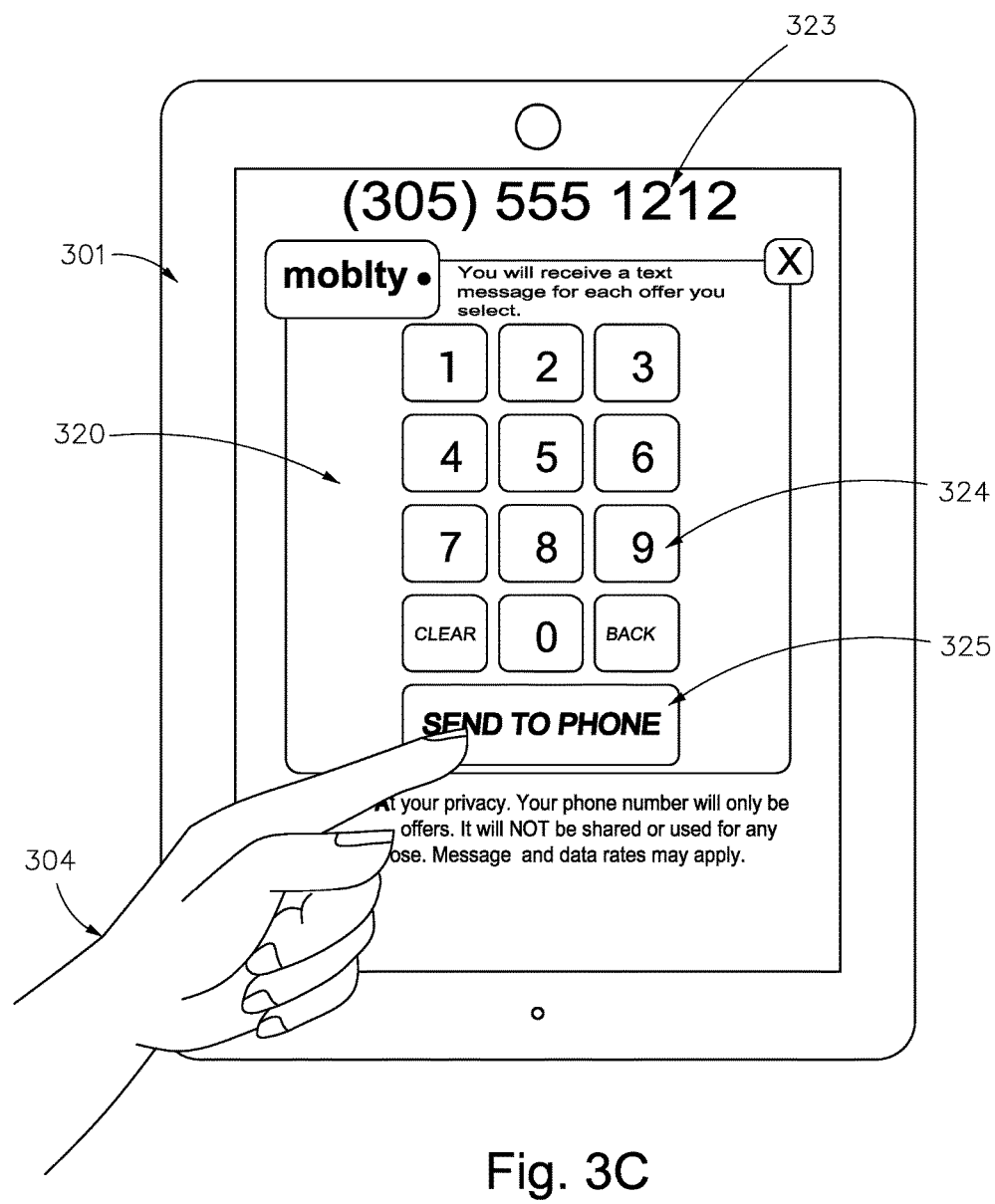
Figure 3D:
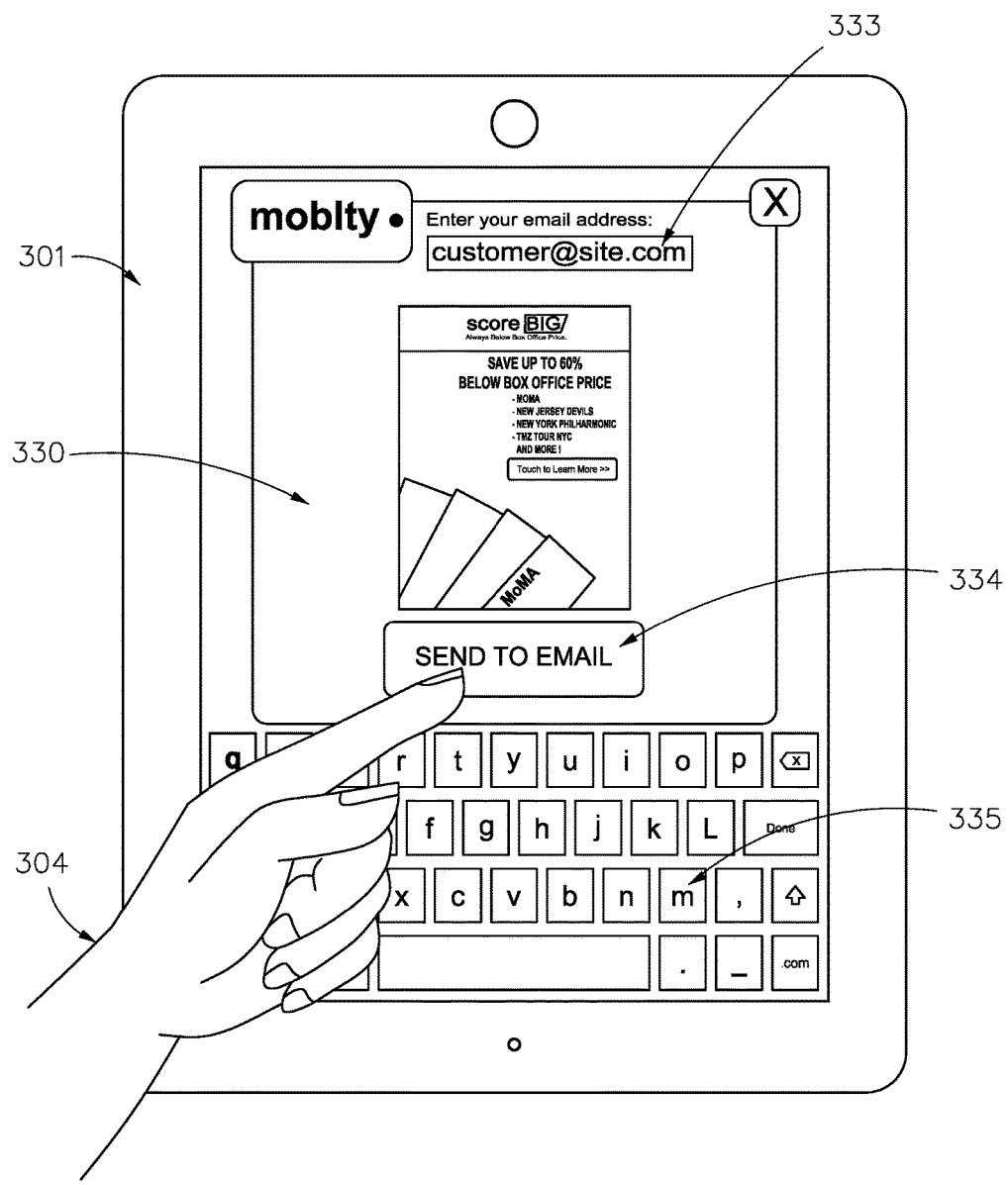
Figure 3E:
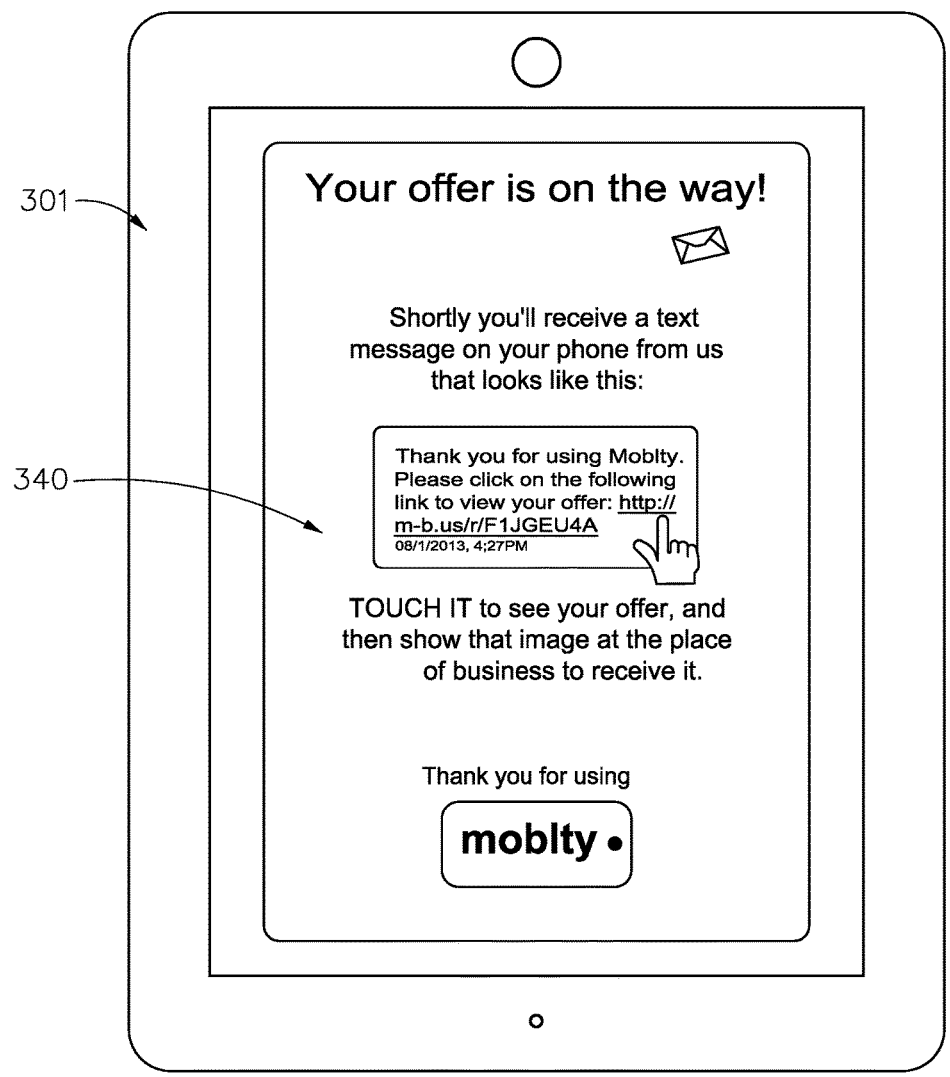
Figure 3F:
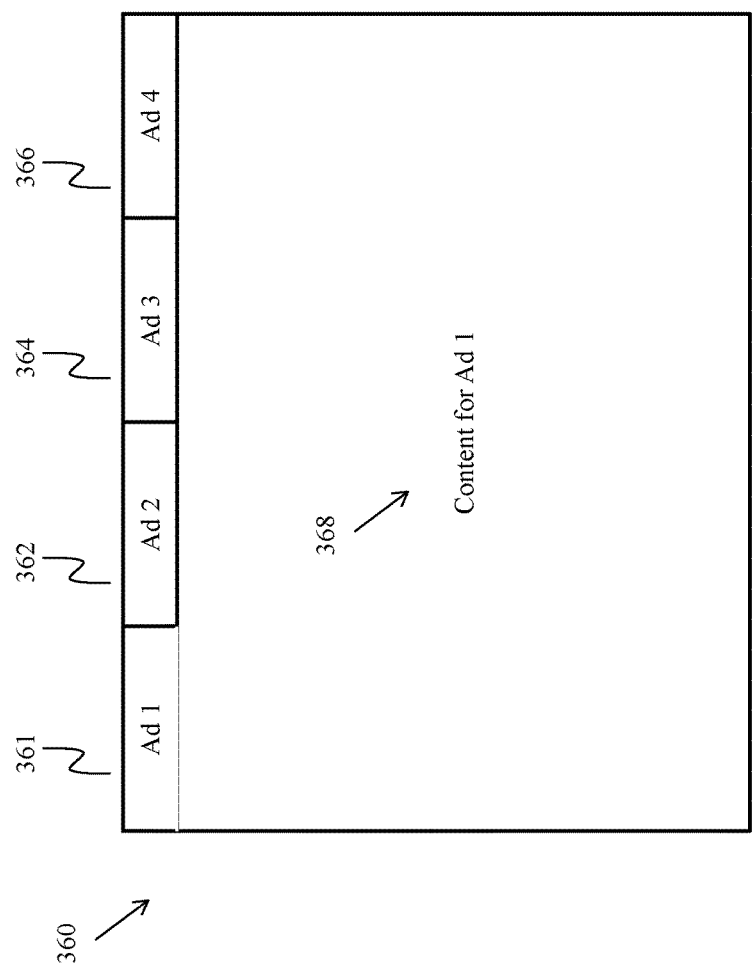
Figure 4:
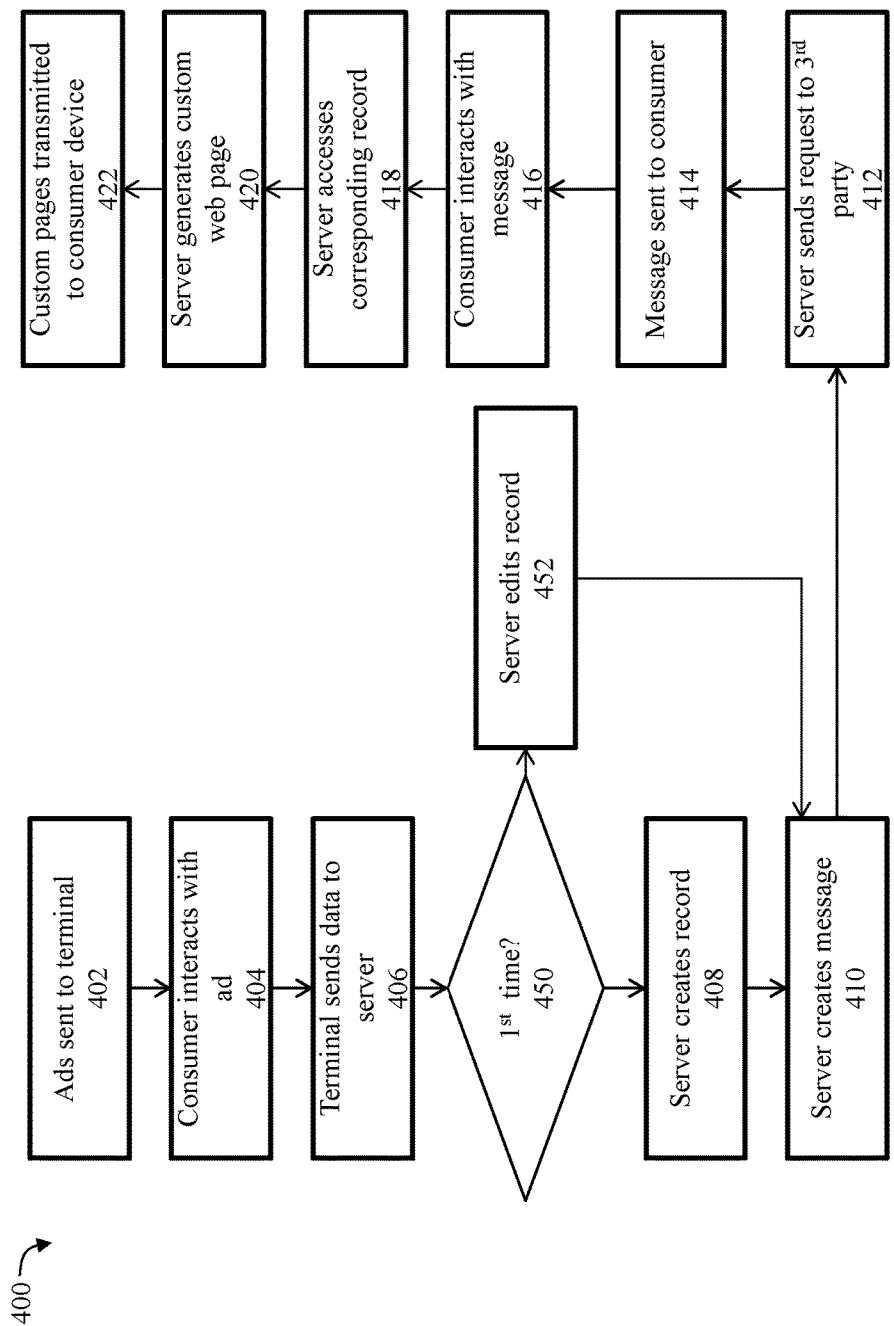
FIG. 4 is a flow chart depicting the general control flow of the process for disseminating ads over a communications network, according to one embodiment.

Alternatively, step 420 includes generating a custom page based on data that was read from the record wherein the record 206 wherein the record 206 includes data pertaining to multiple instances wherein the consumer 110 interacted with various ads. In this case, the content of the custom page corresponds to the ad the consumer desires to view in the current instance (as previously stored in the most recent execution of step 452), as well as previous instances (as stored in earlier executions of step 452 and, in the first instance, in step 408). In this embodiment, the server 102 reads multimedia content from the record 206 (or from another record referenced by record 206) and uses said multimedia content to generate said custom page, which comprises a multiple tab window 360 (see FIG. 3F), wherein tab 361 shows content 368 for the most recent ad the consumer desires to view, and wherein tabs 362, 364, 366 show content for earlier ads the consumer desired to view at earlier times. Although FIG. 3F shows the tabs situated in a horizontal arrangement, the invention also supports the tabs being situated in a vertical arrangement.

In step 422, the server transmits the custom page 212 to the device 122 for viewing by consumer 110. Alternatively, in step 422, the server 102 performs a redirect to an outside or external web site, such as a web site for the advertiser 140.

FIGS. 3A-3E are illustrations depicting various screens presented to consumers (such as consumer 110) during the process for disseminating ads over a communications network, in accordance with one embodiment. The screens shown in the FIGS. 3A-3E are presented to the consumer 110 via one or more graphical user interface executing on a terminal 120, which may be a public or group terminal located in a public place, such as a grocery store or a liquor store. Although FIGS. 3A-3E shows screens situated in a portrait orientation, the invention also supports the screens being situated in a landscape orientation.

Screen 300 on touch screen-enabled tablet computer 301 shows an ad for products. The computer 301 may display various ads and the legend or bar 308 at the bottom of screen 300 shows a group of icons that each represent a separate ad and which indicate which ad is currently being viewed. In one embodiment, the consumer 110 may use his hand 304 to touch the touch screen-enabled tablet computer 301 so as to make sweeping or swiping motions 306 in the left and right directions. Said swiping motions result in a different ad being displayed on computer 301 and the legend or bar 308 thereby modifying the data displayed to indicate which ad is currently being viewed. If the consumer 110 does not touch the screen 300, then the ads auto-rotate from left to right and start over once the last ad has been displayed. Screen 300 also includes a button 303 that includes text representing a call to action, such that when the button 303 is touched by the user's hand 304, the following screen (310) is displayed. If the consumer 110 would like to receive more information about the ad in screen 300, he would press button 303. All touches, taps, swipes, etc. that occur on the screen 300 are recorded and transmitted to server 102 via network 106, wherein said data is used to gauge consumer interest in each ad.

Screen 310 on computer 301 shows a subsequent screen that includes a smaller version 313 of the ad shown in screen 300, as well as various buttons 314, 315 and 316. The button 314 includes text stating "send to phone", such that when the button 314 is touched by the user's hand 304, the following screen (320) is displayed. If the consumer 110 would like to receive more information about the ad in screen 300 on his mobile phone, he would press button 314. The button 315 includes text stating "send to email", such that when the button 315 is touched by the user's hand 304, the following screen (330) is displayed. If the consumer 110 would like to receive more information about the ad in screen 300 via email, he would press button 315. The button 316 includes text stating "select more", such that when the button 316 is touched by the user's hand 304, the previous screen (300) is displayed. If the consumer 110 does not touch the screen 310 after a preset period of time, then the ads will continue to auto-rotate from left to right and start over once the last ad has been displayed.

Screen 320 on computer 301 shows a subsequent screen that the consumer 110 would encounter if he desires to receive more information about the ad in screen 300 on his mobile phone, and he pressed button 314. Screen 320 includes a set of buttons 324 for entering numbers, and a display 323 for viewing the numbers that the consumer 110 has pressed. The button 325 includes text stating "send to phone", such that when the button 325 is touched by the user's hand 304, the following screen (340) is displayed and the process of receiving a text message (pertaining to the ad in screen 300) via mobile phone is initiated. If the consumer 110 does not touch the screen 320 after a preset period of time, then the ads will continue to auto-rotate from left to right and start over once the last ad has been displayed.

Screen 330 on computer 301 shows a subsequent screen that the consumer 110 would encounter if he desires to receive more information about the ad in screen 300 via email, and he pressed button 315. Screen 330 includes a set of buttons 335 for entering an email address, and a display 333 for viewing the characters that the consumer 110 has pressed. The button 334 includes text stating "send to email", such that when the button 334 is touched by the user's hand 304, a screen similar to screen 340 is displayed and the process of receiving an email (pertaining to the ad in screen 300) is initiated. If the consumer 110 does not touch the screen 330 after a preset period of time, then the ads will continue to auto-rotate from left to right and start over once the last ad has been displayed.

Screen 340 on computer 301 shows a final or confirmation screen viewed by the consumer 110 after the process of receiving an email or text (pertaining to the ad in screen 300) has been initiated. Screen 340 includes text stating that the email or text has been sent and the consumer 110 should expect it soon. After a preset period of time, the ads will continue to auto-rotate from left to right and start over once the last ad has been displayed.

Figure 5:
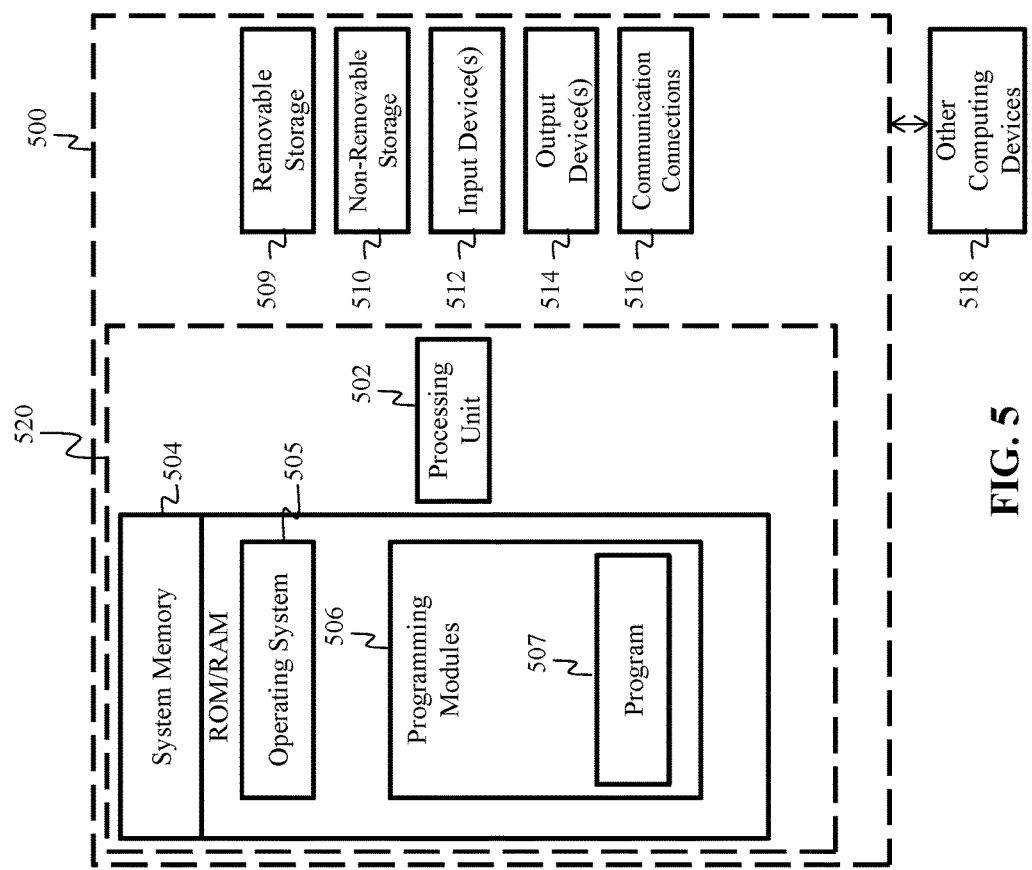
FIG. 5 is a block diagram of a system including an example computing device and other computing devices.

FIG. 5 is a block diagram of a system including an example computing device 500 and other computing devices. Consistent with the embodiments described herein, the aforementioned actions performed by server 102 or devices 120, 122 may be implemented in a computing device, such as the computing device 500 of FIG. 5. Any suitable combination of hardware, software, or firmware may be used to implement the computing device 500. The aforementioned system, device, and processors are examples and other systems, devices, and processors may comprise the aforementioned computing device. Furthermore, computing device 500 may comprise an operating environment for the methods shown in FIGS. 2-4 above.

With reference to FIG. 5, a system consistent with an embodiment of the invention may include a plurality of computing devices, such as computing device 500. In a basic configuration, computing device 500 may include at least one processing unit 502 and a system memory 504. Depending on the configuration and type of computing device, system memory 504 may comprise, but is not limited to, volatile (e.g. random access memory (RAM)), nonvolatile (e.g. read-only memory (ROM)), flash memory, or any combination or memory. System memory 504 may include operating system 505, one or more programming modules 506 (such as program module 507). Operating system 505, for example, may be suitable for controlling computing device 500's operation. In one embodiment, programming modules 506 may include, for example, a program module 507. Furthermore, embodiments of the invention may be practiced in conjunction with a graphics library, other operating systems, or any other application program and is not limited to any particular application or system. This basic configuration is illustrated in FIG. 5 by those components within a dashed line 520.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by a removable storage 509 and a non-removable storage 510. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of device 500. Computing device 500 may also have input device(s) 512 such as a keyboard, a mouse, a pen, a sound input device, a camera, a touch input device, etc. Output device(s) 514 such as a display, speakers, a printer, etc. may also be included. The aforementioned devices are only examples, and other devices may be added or substituted.

Computing device 500 may also contain a communication connection 516 that may allow device 500 to communicate with other computing devices 518, such as over a network in a distributed computing environment, for example, an intranet or the Internet. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 504, including operating system 505. While executing on processing unit 502, programming modules 506 may perform processes including, for example, one or more of the methods shown in FIGS. 2-4 above. Computing device 502 may also include a graphics processing unit 503, which supplements the processing capabilities of processor 502 and which may execute programming modules 506, including all or a portion of those processes and methods shown in FIGS. 2-4 above The aforementioned processes are examples, and processing units 502, 503 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method on a server for disseminating ads over a communications network, comprising:
   a) transmitting, over the communications network, a plurality of ads to a plurality of terminals, wherein each of the plurality of terminals is associated with a unique terminal identifier, and wherein each of the plurality of ads is associated with a unique ad identifier;
   b) receiving, over the communications network, a data packet from a particular one of the plurality of terminals at the direction of a consumer, wherein the data packet includes the consumer's telephone number, a unique ad identifier for a particular one of the plurality of ads selected by the consumer, and a unique terminal identifier for the particular one of the plurality of terminals;
   c) generating a record including the consumer's telephone number, the unique ad identifier and the unique terminal identifier, and further including a unique record identifier and a timestamp, and storing said record in a connected database;
   d) generating a message associated with the particular one of the plurality of ads, wherein the message includes alphanumeric data, the unique record identifier and a link configured to transmit a request including the unique record identifier to the server when activated, and wherein the message includes an invitation to the consumer to click on the link to receive an offer for a product advertised by the particular one of the plurality of ads selected by the consumer;
   e) transmitting, over the communications network, to a text message gateway a request to send a text message, wherein the request includes the message and the consumer's telephone number;
   f) receiving, over the communications network, at the direction of a consumer, a request including the unique record identifier from the consumer's mobile device identified by the consumer's telephone number;
   g) accessing, in the connected database, the record using the unique record identifier, and reading data in the record;
   h) generating a custom page based on the data from the record, wherein content of the custom page corresponds to the offer for the product advertised by the particular one of the plurality of ads selected by the consumer; and
   i) transmitting, over the communications network, the custom page to the consumer's mobile device identified by the consumer's telephone number.

2. The method of claim 1, further comprising a step before the step of transmitting a plurality of ads of:
   storing in the connected database an ad record associated with each of the plurality of ads, wherein an ad record includes a unique ad identifier, a product or service description, and an image of the product or service.

3. The method of claim 2, wherein the step of transmitting a plurality of ads further comprises:
   transmitting a plurality of ads to a plurality of terminals, wherein each of the plurality of ads comprises a web page.

4. The method of claim 3, wherein the step of transmitting a plurality of ads further comprises:
   transmitting a plurality of ads to a plurality of terminals via HTTPS.

5. The method of claim 1, further comprising a step before the step of transmitting a plurality of ads of:

storing in the connected database a terminal record associated with each of the plurality of terminals, wherein a terminal record includes a unique record identifier, a unique terminal identifier, and a geographic location identifier for a terminal.

6. The method of claim 5, wherein the step of generating a record further comprises:
generating an activity record.

7. The method of claim 6, wherein the step of receiving a data packet further comprises:
receiving a data packet via HTTPS.

8. The method of claim 7, wherein the step of transmitting to a text message gateway further comprises:
transmitting to a text message gateway via HTTPS.

9. The method of claim 8, wherein the step of receiving a request further comprises:
receiving an HTTPS request.

10. The method of claim 1, wherein the step of accessing the record further comprises:
accessing in the connected database the record using the unique record identifier and reading instructions from the record, wherein said instructions define construction of a page.

11. The method of claim 10, wherein the step of generating a custom page further comprises:
generating a custom page based on the instructions from the record, wherein content of the custom page corresponds to the particular one of the plurality of ads.

12. The method of claim 11, wherein the step of transmitting the custom page further comprises:
transmitting the custom page via HTTPS.

13. A server for disseminating ads over a communications network, the server comprising:
a database for storing activity records;
a network interface device communicatively coupled with the communications network; and
a processor communicatively coupled with the network interface device, the processor configured for:
a) transmitting, over the communications network, a plurality of ads to a plurality of terminals, wherein each of the plurality of terminals is associated with a unique terminal identifier, and wherein each of the plurality of ads is associated with a unique ad identifier;
b) receiving, over the communications network, a data packet from a particular one of the plurality of terminals at the direction of a consumer, wherein the data packet includes the consumer's telephone number, a unique ad identifier for a particular one of the plurality of ads selected by the consumer, and a unique terminal identifier for the particular one of the plurality of terminals;
c) generating an activity record including the consumer's telephone number, the unique ad identifier and the unique terminal identifier, and further including a unique record identifier and a timestamp, and storing said activity record in the database;
d) generating a message associated with the particular one of the plurality of ads, wherein the message includes alphanumeric data, the unique record identifier and a link configured to transmit a request including the unique record identifier to the server when activated, and wherein the message includes an invitation to the consumer to click on the link to receive an offer for a product advertised by the particular one of the plurality of ads selected by the consumer;
e) transmitting, over the communications network, to a text message gateway a request to send a text message, wherein the request includes the message and the consumer's telephone number;
f) receiving, over the communications network, at the direction of a consumer, a request including the unique record identifier from the consumer's mobile device identified by the consumer's telephone number;
g) accessing, in the connected database, the activity record using the unique record identifier, and reading data in the record;
h) generating a custom page based on the data from the activity record, wherein content of the custom page corresponds to the offer for the product advertised by the particular one of the plurality of ads selected by the consumer; and
i) transmitting, over the communications network, the custom page to the consumer's mobile device identified by the consumer's telephone number.

14. The server of claim 13, wherein the processor is further configured for:
storing in the connected database an ad record associated with each of the plurality of ads, wherein an ad record includes a unique ad identifier, a product or service description, and an image of the product or service, and
storing in the connected database a terminal record associated with each of the plurality of terminals, wherein a terminal record includes a unique record identifier, a unique terminal identifier, and a geographic location identifier for a terminal.

15. The server of claim 14, wherein the step of transmitting a plurality of ads further comprises:
transmitting a plurality of ads to a plurality of terminals, wherein each of the plurality of ads comprises a web page.

16. The server of claim 15, wherein the step of transmitting a plurality of ads further comprises:
transmitting a plurality of ads to a plurality of terminals via HTTPS.

17. The server of claim 16, wherein the step of accessing the activity record further comprises:
accessing in the connected database the activity record using the unique record identifier and reading instructions from the activity record, wherein said instructions define construction of a page.

18. The server of claim 10, wherein the step of generating a custom page further comprises:
generating a custom page based on the instructions from the activity record, wherein content of the custom page corresponds to the particular one of the plurality of ads.

19. A computer readable storage medium storing executable instructions, which, when executed by a computer device, cause the computing device to perform a method for disseminating ads over a communications network, the method comprising:
a) transmitting, over the communications network, a plurality of ads to a plurality of terminals, wherein each of the plurality of terminals is associated with a unique terminal identifier, and wherein each of the plurality of ads is associated with a unique ad identifier;
b) receiving, over the communications network, a data packet from a particular one of the plurality of terminals at the direction of a consumer, wherein the data packet includes the consumer's telephone number, a unique ad identifier for a particular one of the plurality of ads selected by the consumer, and a unique terminal identifier for the particular one of the plurality of terminals;

c) generating a record including the consumer's telephone number, the unique ad identifier and the unique terminal identifier, and further including a unique record identifier and a timestamp, and storing said record in a connected database;
d) generating a message associated with the particular one of the plurality of ads, wherein the message includes alphanumeric data, the unique record identifier and a link configured to transmit a request including the unique record identifier to the server when activated, and wherein the message includes an invitation to the consumer to click on the link to receive an offer for a product advertised by the particular one of the plurality of ads selected by the consumer;
e) transmitting, over the communications network, to a text message gateway a request to send a text message, wherein the request includes the message and the consumer's telephone number,
f) receiving, over the communications network, at the direction of a consumer, a request including the unique record identifier from the consumer's mobile device identified by the consumer's telephone number;
g) accessing, in the connected database, the record using the unique record identifier, and reading data in the record;
h) generating a custom page based on the data from the record, wherein content of the custom page corresponds to the offer for the product advertised by the particular one of the plurality of ads selected by the consumer; and
i) transmitting, over the communications network, the custom page to the consumer's mobile device identified by the consumer's telephone number.

20. The computer readable storage medium of claim 19, further comprising a step before the step of transmitting a plurality of ads of:

storing in the connected database a terminal record associated with each of the plurality of terminals, wherein a terminal record includes a unique record identifier, a unique terminal identifier, and a geographic location identifier for a terminal.

* * * * *